(12) United States Patent
Lu et al.

(10) Patent No.: US 10,827,348 B2
(45) Date of Patent: Nov. 3, 2020

(54) DATA TRANSMISSION METHOD AND APPARATUS

(71) Applicant: HUAWEI TECHNOLOGIES CO., LTD., Shenzhen, Guangdong (CN)

(72) Inventors: Wei Lu, Shanghai (CN); Weisheng Jin, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/192,724

(22) Filed: Nov. 15, 2018

(65) Prior Publication Data

US 2019/0090128 A1 Mar. 21, 2019

Related U.S. Application Data

(63) Continuation of application No. PCT/CN2016/082217, filed on May 16, 2016.

(51) Int. Cl.
*H04W 8/26* (2009.01)
*H04W 76/12* (2018.01)
(Continued)

(52) U.S. Cl.
CPC .............. *H04W 8/26* (2013.01); *H04W 8/08* (2013.01); *H04W 36/0033* (2013.01);
(Continued)

(58) Field of Classification Search
CPC ....... H04W 8/26; H04W 76/12; H04W 76/30; H04W 76/11; H04W 8/08; H04W 36/0033; H04W 88/16
See application file for complete search history.

(56) References Cited

U.S. PATENT DOCUMENTS

2011/0280248 A1* 11/2011 Singh ................. H04L 12/56
2013/0294240 A1 11/2013 Suni
(Continued)

FOREIGN PATENT DOCUMENTS

CN 103430516 A 12/2013
CN 103999434 A 8/2014
(Continued)

OTHER PUBLICATIONS

ETSI GS MEC 002 V1.1.1,Mobile Edge Computing (MEC);Technical Requirements,(Mar. 2016),total 40 pages.
(Continued)

*Primary Examiner* — Ronald B Abelson
(74) *Attorney, Agent, or Firm* — Womble Bond Dickinson (US) LLP

(57) ABSTRACT

Embodiments of the present invention provide a data transmission method and a device. The method includes: receiving, by a mobile edge computing MEC network element, address information of a first communications device sent by the first communications device; and storing, by the MEC network element, the address information of the first communications device, where the address information of the first communications device is used to determine a destination address of an uplink data packet or a first downlink data packet of a terminal. In the embodiments of the present invention, the MEC network element receives address information of a communications device sent by the communications device, and stores the address information of the communications device.

7 Claims, 9 Drawing Sheets

(51) Int. Cl.
*H04W 76/30* (2018.01)
*H04W 76/11* (2018.01)
*H04W 8/08* (2009.01)
*H04W 36/00* (2009.01)
*H04W 88/16* (2009.01)
*H04L 29/08* (2006.01)
*H04W 92/04* (2009.01)
*H04W 4/50* (2018.01)

(52) U.S. Cl.
CPC ............ *H04W 76/11* (2018.02); *H04W 76/12* (2018.02); *H04W 76/30* (2018.02); *H04W 88/16* (2013.01); *H04L 67/289* (2013.01); *H04W 4/50* (2018.02); *H04W 92/045* (2013.01)

(56) References Cited

U.S. PATENT DOCUMENTS

| | | | |
|---|---|---|---|
| 2014/0310426 A1 | 10/2014 | Damola et al. | |
| 2015/0365819 A1 | 12/2015 | Zhu et al. | |
| 2016/0373360 A1* | 12/2016 | Frydman | H04L 47/22 |
| 2018/0249389 A1* | 8/2018 | Zhu | H04W 36/06 |

FOREIGN PATENT DOCUMENTS

| | | |
|---|---|---|
| CN | 105578199 A | 5/2016 |
| EP | 1633153 A1 | 3/2006 |
| EP | 2953400 A1 | 12/2015 |
| KR | 20120059166 A | 6/2012 |

OTHER PUBLICATIONS

Yun Chao Hu et al.,"Mobile Edge Computing A key technology towards 5G",ETSI White Paper No. 11,First edition—Sep. 2015,ISBN No. 979-10-92620-08-5,total 16 pages.

Huawei et al., Mobile-Edge Computing—Introductory Technical White Paper,Publication date: Sep. 2014,total 36 pages.

ETSI GS MEC 003 V1.1.1,Mobile Edge Computing (MEC);Framework and Reference Architecture,(Mar. 2016),total 18 pages.

ETSI GS MEC-IEG 004 V1.1.1,Mobile-Edge Computing (MEC);Service Scenarios,(Nov. 2015),total 16 pages.

ETSI GS MEC-IEG 005 V1.1.1,Mobile-Edge Computing (MEC);Proof of Concept Framework,(Aug. 2015),total 14 pages.

* cited by examiner

DATA TRANSMISSION METHOD AND APPARATUS

CROSS-REFERENCE TO RELATED APPLICATIONS

This application is a continuation of International Application No. PCT/CN2016/082217, filed on May 16, 2016, the disclosure of which is hereby incorporated by reference in its entirety.

TECHNICAL FIELD

The present invention relates to the field of communications technologies, and in particular, to a data transmission method and an apparatus.

BACKGROUND

To enhance service experience of a user, a mobile edge computing (MEC for short) network element can be deployed near an access network. The MEC network element has computation and storage capabilities, and can obtain a data packet of a terminal, and route the data packet after processing the data packet.

There are two deployment modes of the MEC network element. One mode is that the MEC network element is separately connected to an eNB, and another mode is that the MEC network element is connected to an S1 user plane (S1 User Plane, S1-U for short) interface between an evolved NodeB (eNB or eNodeB for short) and a Serving Gateway (SGW for short). However, currently, no related solution is available for establishing a connection between the MEC network element and the eNB or the SGW.

SUMMARY

Embodiments of the present invention provide a data transmission method and an apparatus, so as to establish a data transmission channel between a mobile edge computing MEC network element and a communications device.

According to one aspect, an embodiment of the present invention provides a data transmission method, including: receiving, by an MEC network element, address information of a first communications device sent by the first communications device; and storing, by the MEC network element, the address information of the first communications device, where the address information of the first communications device is used to determine a destination address of an uplink data packet or a first downlink data packet of a terminal.

The first communications device may be an access network device or a gateway device.

The MEC network element can determine a destination address of a data packet of the terminal based on the address information of the first communications device, for example, the MEC network element uses an address identified by the address information of the first communications device as the destination address of the data packet of the terminal.

In this embodiment of the present invention, the MEC network element receives address information of a communications device sent by the communications device, and stores the address information of the communications device, so that the MEC network element can determine a destination address of a data packet of the terminal based on the address information of the communications device, a data transmission channel can be established between the MEC network element and the communications device, and then data can be transmitted between the MEC network element and the communications device.

In one embodiment, the address information of the first communications device is used to determine the destination address of the uplink data packet of the terminal, and the method further includes: receiving, by the MEC network element, address information of a second communications device sent by the first communications device; and storing, by the MEC network element, the address information of the second communications device, where the address information of the second communications device is used to determine a destination address of a second downlink data packet of the terminal.

The first communications device is a gateway device, and the second communications device is an access network device.

In one embodiment, the method further includes: deleting, by the MEC network element, the stored address information of the first communications device.

For example, the MEC network element can receive a bearer release request message sent by the first communications device, and delete the stored address information of the first communications device based on the bearer release request message, that is, release a data transmission channel between the MEC network element and the communications device. In this way, when the terminal enters an idle mode, the MEC network element deletes the stored related information in time to avoid a waste of storage resources.

According to another aspect, an embodiment of the present invention provides a method for transmitting data, including: obtaining, by a first communications device, address information of a mobile edge computing MEC network element; and sending, by the first communications device, address information of the first communications device to the MEC network element based on the address information of the MEC network element, where the address information of the first communications device is used to determine a destination address of an uplink data packet or a first downlink data packet of a terminal.

In one embodiment, after obtaining the address information of the MEC network element, the first communications device may use an address identified by the address information of the MEC network element as a destination address of a data packet of the terminal.

In one embodiment, the address information of the first communications device may be carried in a message that is sent by the first communications device to the MEC network element. For example, the communications device sends a session creation request message to the MEC network element, where the session modification request message includes address information of the communications device. The session creation request message may be used to request to establish a data transmission channel with the MEC network element.

In one embodiment, the communications device may further send identification information of the terminal to the MEC network element.

The first communications device may be an access network device or a gateway device.

In this embodiment of the present invention, the first communications device sends the address information of the communications device to the MEC network element, so that the MEC network element can determine a destination address of an uplink data packet of the terminal or a first downlink data packet of the terminal based on the address information of the first communications device. Therefore, a data transmission channel can be established between the MEC network element and the communications device, so that data can be transmitted between the MEC network element and the communications device.

In one embodiment, the obtaining, by a first communications device, address information of the MEC network element includes: receiving, by the communications device, the address information of the MEC network element sent by a mobility management network element; or obtaining, by the first communications device, the address information of the MEC network element based on a correspondence, where the correspondence is a correspondence between the address information of the MEC network element and either one or both of identification information of the terminal and identification information of the first communications device.

In one embodiment, the address information of the first communications device is used to determine the destination address of the uplink data packet of the terminal, and the method further includes: receiving, by the first communications device, address information of a second communications device sent by a mobility management network element; and sending, by the first communications device, the address information of the second communications device to the MEC network element, where the address information of the second communications device is used to determine a destination address of a second downlink data packet of the terminal.

In one embodiment, the method further includes: instructing, by the first communications device, the MEC network element to delete stored address information of the communications device.

In this embodiment of the present invention, when the terminal enters an idle mode, the terminal can instruct the MEC network element in time to delete the related information, thereby avoiding a waste of storage resources.

According to still another aspect, an embodiment of the present invention provides a method for transmitting data, including: obtaining, by a mobility management network element, address information of an MEC network element, and sending, by the mobility management network element, the address information of the MEC network element to a communications device.

The communications device is an access network device or a gateway device.

In this embodiment of the present invention, the mobility management network element obtains the address information of the MEC network element, and sends the address information of the MEC network element to the communications device, so that the communications device can establish a data transmission channel with the MEC network element, and data can be transmitted between the MEC network element and the communications device.

In one embodiment, the mobility management network element obtains the address information of the MEC network element based on a correspondence, where the correspondence is a correspondence between the address information of the MEC network element and either one or both of identification information of the terminal and identification information of the communications device.

According to still another aspect, an embodiment of the present invention provides an MEC network element. The MEC network element has a function of implementing behavior of the MEC network element in the foregoing method design. The function may be implemented by hardware, or may be implemented by executing corresponding software by hardware. The hardware or the software includes one or more modules corresponding to the function.

In one embodiment, the MEC network element includes a processing unit and a communications unit. The processing unit is configured to support the MEC network element in performing a corresponding function in the foregoing method. The communications unit is configured to support communication between the MEC network element and another device. The MEC network element may further include a storage unit. The storage unit is configured to couple with the processing unit, and the storage unit stores a program instruction and data that are necessary for the MEC network element. As an example, the processing unit may be a processor, the communications unit may be a communications interface, and the storage unit may be a memory.

According to still another aspect, an embodiment of the present invention provides a communications device. The communications device has a function of implementing behavior of the first communications device in the foregoing method design. The function may be implemented by hardware, or may be implemented by executing corresponding software by hardware. The hardware or the software includes one or more modules corresponding to the function.

In one embodiment, the communications device includes a processing unit and a communications unit. The processing unit is configured to support the communications device in performing a corresponding function in the foregoing method. The communications unit is configured to support communication between the communications device and another device. The communications device may further include a storage unit. The storage unit is configured to couple with the processing unit, and the storage unit stores a program instruction and data that are necessary for the communications device. As an example, the processing unit may be a processor, the communications unit may be a communications interface, and the storage unit may be a memory.

According to still another aspect, an embodiment of the present invention provides a mobility management network element. The mobility management network element has a function of implementing behavior of the mobility management network element in the foregoing method design. The function may be implemented by hardware, or may be implemented by executing corresponding software by hardware. The hardware or the software includes one or more modules corresponding to the function.

In one embodiment, the mobility management network element includes a processing unit and a communications unit. The processing unit is configured to support the mobility management network element in performing a corresponding function in the foregoing method. The communications unit is configured to support communication between the mobility management network element and another device. The mobility management network element may further include a storage unit. The storage unit is configured to couple with the processing unit, and the storage unit stores a program instruction and data that are necessary for the mobility management network element. As an example, the processing unit may be a processor, the communications unit may be a communications interface, and the storage unit may be a memory.

According to still another aspect, an embodiment of the present invention provides a communications system. The communications system includes the MEC network element and the communications device that are described in the foregoing aspects, or the communications system includes the MEC network element, the communications device, and the mobility management network element that are described in the foregoing aspects.

According to a further aspect, an embodiment of the present invention provides a computer readable storage medium, configured to store a computer software instruction used by the foregoing MEC network element. The computer readable storage medium includes a program used for executing the foregoing aspects.

According to a further aspect, an embodiment of the present invention provides a computer readable storage medium, configured to store a computer software instruction used by the foregoing first communications device. The computer readable storage medium includes a program used for executing the foregoing aspects.

According to a further aspect, an embodiment of the present invention provides a computer readable storage medium, configured to store a computer software instruction used by the foregoing mobility management network element. The computer readable storage medium includes a program used for executing the foregoing aspects.

In the solutions of the embodiments of the present invention, the MEC network element receives the address information of the first communications device sent by the first communications device, so that the MEC network element can determine a destination address of an uplink data packet of the terminal or a first downlink data packet of the terminal based on address information of a communications device. Therefore, a data transmission channel can be established between the MEC network element and the communications device, so that data can be transmitted between the MEC network element and the communications device.

DESCRIPTION OF EMBODIMENTS

Figure 1:
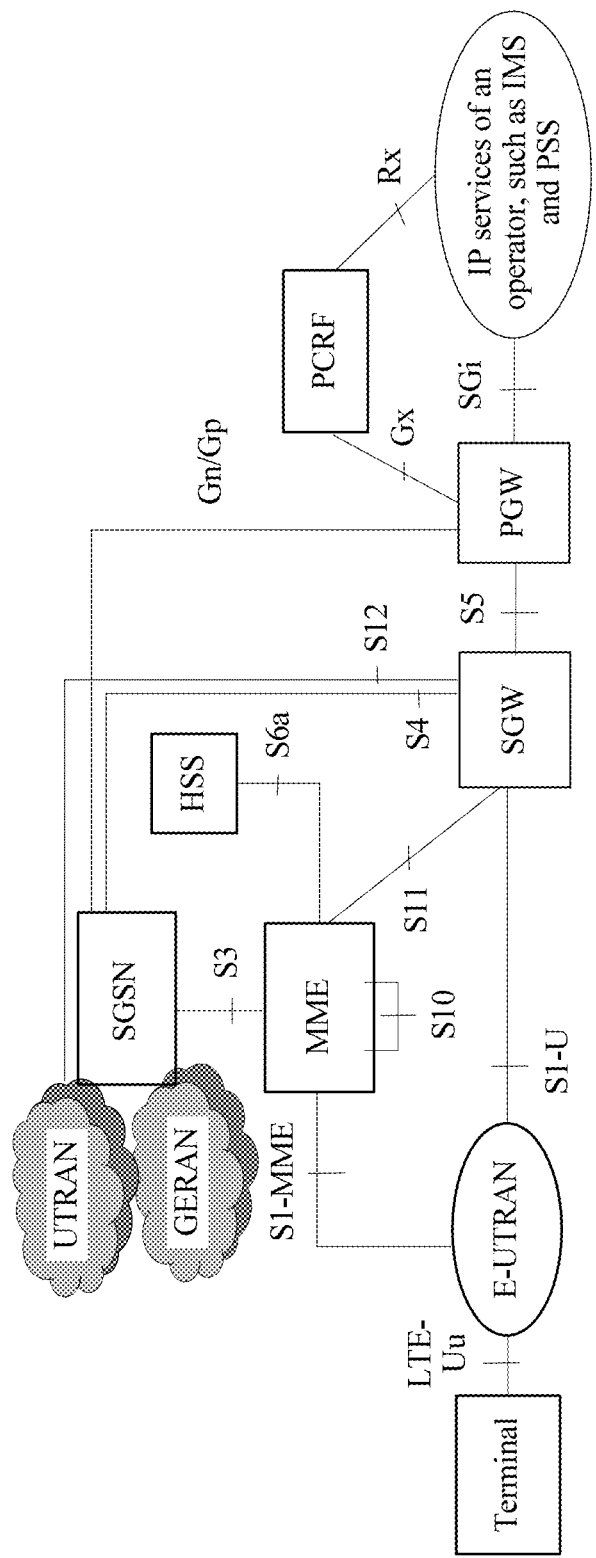
FIG. 1 is a schematic diagram of a possible system architecture according to an embodiment of the present invention.

To make the purpose, technical solutions, and advantages of the embodiments of the present invention clearer, the following describes the technical solutions of the embodiments of the present invention with reference to the accompanying drawings in the embodiments of the present invention.

Network architectures and service scenarios described in the embodiments of the present invention aim to more clearly describe the technical solutions in the embodiments of the present invention, but are not intended to limit the technical solutions provided in the embodiments of the present invention. A person of ordinary skill in the art may know that as the network architectures evolve and a new service scenario emerges, the technical solutions provided in the embodiments of the present invention are also applicable to a similar technical problem.

In the embodiments of the present invention, nouns "network" and "system" are often interchangeably used, but meanings of the nouns can be understood by a person skilled in the art. The terminal used in the embodiments of the present invention may include various handheld devices, vehicle-mounted devices, wearable devices, computing devices, or other processing devices connected to a wireless modem, and various forms of user equipment (UE), mobile stations (MS), terminal devices, and the like. For ease of description, the devices mentioned above are collectively referred to as terminals. An access network device used in the embodiments of the present invention may be a base station (BS), and the base station is an apparatus that is deployed in a radio access network to provide a wireless communication function for a terminal. The base station may include a macro base station, a micro base station, a relay node, an access point, and the like that are in various forms. In systems that use different radio access technologies, names of devices having a base station function may be different. For example, in a Long Term Evolution (LTE) system, a device having the base station function is referred to as an evolved NodeB (eNB or eNodeB), and in a 3G communications system, a device having the base station function is referred to as a NodeB, or the like. For ease of description, in the embodiments of the present invention, the foregoing apparatuses that provide the wireless communication function for the terminal are collectively referred to as base stations or BSs.

A mobility management network element may be a mobility management entity (MME for short) or a general packet radio system (GPRS for short) service support node (SGSN for short), and this is not limited in the present invention.

However, for ease of description, the following describes solutions in the embodiments of the present invention by using an eNB, a terminal, and an MME as an example. It should be understood that although the eNB is used as an example in the following to describe an access network device, the MME is used as an example to describe the mobility management network element, but the embodiments of the present invention are not limited to a standard represented by these terms. The embodiments of the present invention may also be applied to another standard, and all these changes fall within the scope of the embodiments of the present invention.

The embodiments of the present invention may be applied to a system architecture shown in FIG. 1. The following first describes main network entities in the system architecture.

Evolved universal terrestrial radio access network (E-UTRAN for short): a network including a plurality of eNBs. The E-UTRAN implements wireless physical layer functions, resource scheduling and radio resource management, radio access control, and mobility management functions. The eNB is connected to an SGW by using an S1-U interface, to transmit user data; and the eNB is connected to an MME by using an S1 control plane interface (S1-MME interface), and uses an S1 application protocol (S1-AP for short) to implement functions such as radio access bearer control.

MME: Mainly responsible for all control plane functions related to user management and session management, including non-access stratum (NAS for short) signaling and security, tracking area list (TAL for short) management, PGW selection, SGW selection, and the like.

SGW: The SGW is mainly responsible for data transmission, forwarding, routing handover, and the like for a terminal, and serves as a local mobility anchor point when the terminal hands over between the eNBs.

Packet data network gateway (PDN GW or PGW for short): an entrance for an external network to send data to a terminal, and responsible for allocation of an Internet Protocol (IP for short) address for the terminal, data packet filtering, rate control, generating billing information, and the like for the terminal.

After the terminal accesses an evolved packet system (EPS for short), the PGW allocates an IP address to the terminal. The terminal implements connection to the external network by using the IP address to perform data transmission. All uplink data packets of the terminal are sent to the external network by using the PGW, and all downlink data packets of the external network are sent to the terminal by using the PGW.

A data packet sent or received by the terminal is transmitted in an EPS network by using an EPS bearer. Each terminal may have a plurality of bearers, and different bearers may meet a quality of service (QoS for short) requirement of different services. The eNB and the SGW store information about each bearer, that is, a bearer context, where the bearer context includes information about an SGW tunnel endpoint identifier (TEID for short) and an eNB TEID of the bearer, where the SGW TEID is used for an uplink data packet sent by the eNB to the SGW, and the eNB TEID is used for a downlink data packet sent by the SGW to the eNB. The eNB implements synchronization of the bearer context with the MME by using an S1-AP message, and the SGW implements synchronization of the bearer context with the MME by using a GPRS tunneling protocol-control plane (GTP-C for short) message. In this way, synchronization of the bearer context between the eNB and the SGW is implemented.

When receiving the uplink data packet of the terminal, the eNB encapsulates the uplink data packet of the terminal into an uplink GPRS tunneling protocol user plane (GTP-U for short) packet based on the bearer context, where the uplink GTP-U packet includes a GTP-U header, and the GTP-U header includes the SGW TEID information of the bearer. Because different bearers use different SGW TEIDs, when receiving the uplink GTP-U packet sent by the eNB, the SGW may determine, based on the GTP-U header, the bearer to which the packet belongs. When receiving the downlink data packet sent to the terminal, the SGW encapsulates the downlink data packet into a downlink GTP-U packet, where the downlink GTP-U packet includes the GTP-U header, and the GTP-U header includes the eNB TEID information of the bearer.

In an LTE network architecture shown in FIG. 1, a process of performing a mobile service by the terminal is as follows:

(1) The terminal is attached to a network first.

(2) The network side establishes a bearer for the terminal, and the data flow of the terminal is sent to a peer end, for example, an application server or a peer terminal, by using the bearer.

In a process of establishing the bearer, the MME selects an SGW and a PGW for the terminal, and then the SGW and the eNB exchange an address of the bearer (including IP addresses and TEIDs of the SGW and the eNB) by using the MME, that is, the SGW sends, by using the MME, an IP address of the SGW and a TEID allocated to the bearer to the eNB, the eNB sends, by using the MME, an IP address of the eNB and the TEID allocated to the bearer to the SGW, the eNB sends a data packet to the IP address of the SGW and an address indicated by the TEID, and the SGW sends a data packet to the IP address of the eNB and the address indicated by the TEID. In this way, the bearer between the eNB and the SGW is successfully established.

An MEC network element mainly includes a data bus and an application. The data bus is responsible for obtaining a data packet of a terminal and forwarding the data packet to a corresponding application. After processing the data packet, the application returns the packet to the data bus to perform routing. A plurality of applications can be installed on the MEC network element to enhance service experience of a user. An application on the MEC network element may intercept data sent by the terminal for modification, detection, forwarding, or the like, or may directly respond to the data sent by the terminal. For example, the MEC network element may install a video cache application. When the terminal requests a video service, the request of the terminal is processed by the video cache application. If the video cache application does not have the video requested by the terminal, the video cache application continues to forward the request to the SGW; or if the video cache application stores the video requested by the terminal, the video cache application directly sends a video data packet to the terminal. Therefore, deploying the MEC network element near an access network can effectively improve service experience of the user.

Figure 2A:
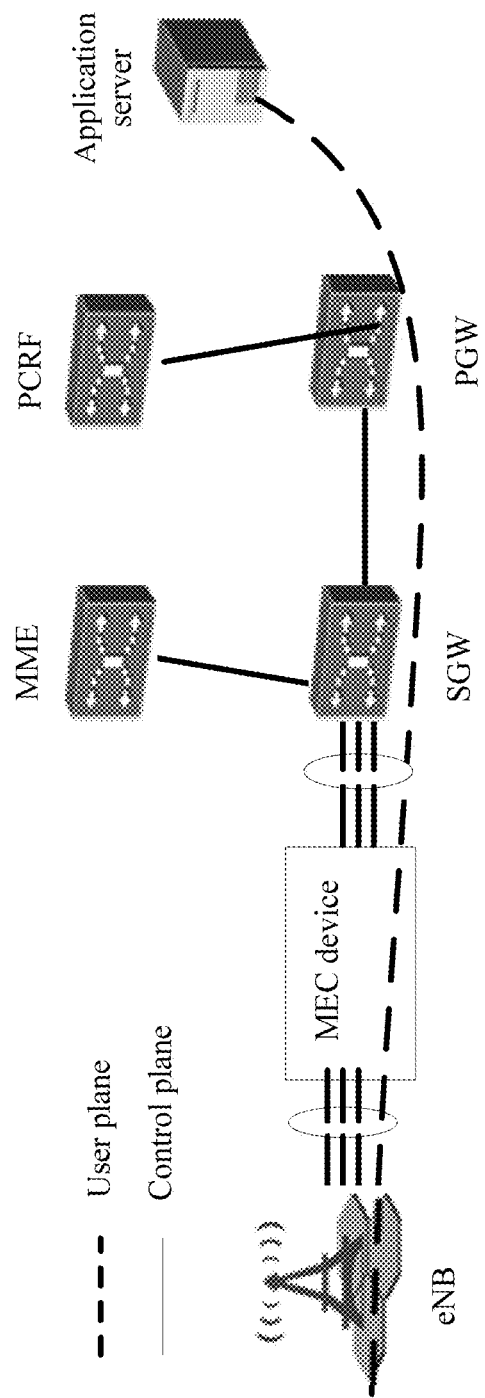
FIG. 2A is a schematic diagram of an application scenario according to an embodiment of the present invention.

FIG. 2A is a schematic diagram of an application scenario of an embodiment of the present invention. As shown in FIG. 2A, the MEC network element is connected to the S1-U interface between the eNB and the SGW device, that is, the eNB transmits uplink data to the SGW by using the MEC network element, or the SGW transmits downlink data to the eNB by using the MEC network element. Based on a configuration of an operator, the MEC network element may establish a connection to the eNB, or the MEC network element may also establish a connection to the SGW.

Figure 2B:
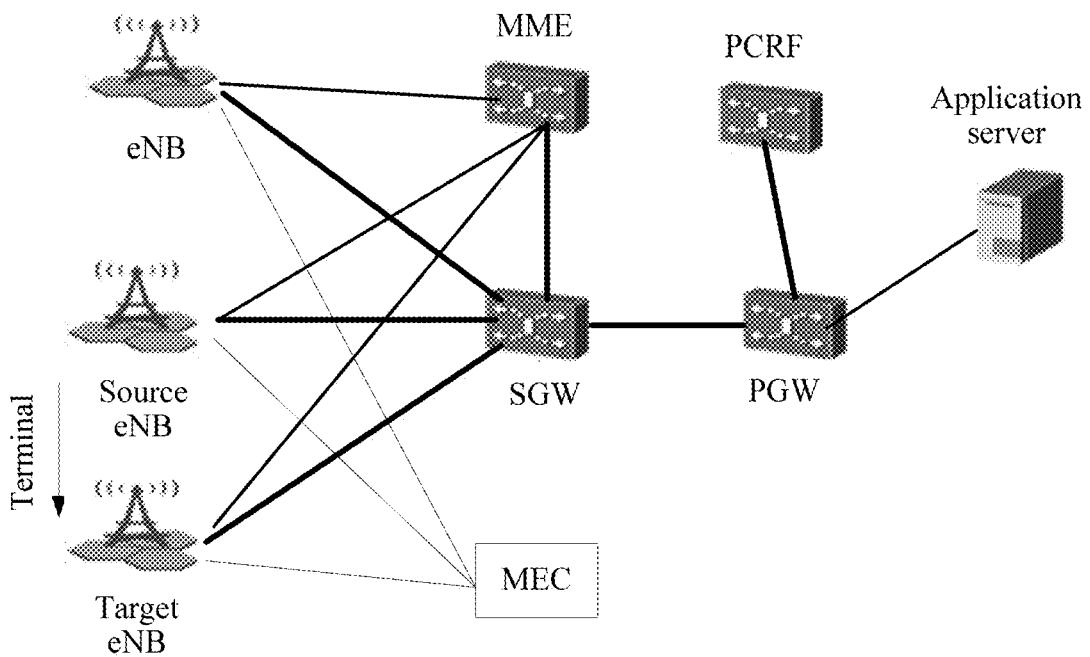
FIG. 2B is a schematic diagram of another application scenario according to an embodiment of the present invention.

FIG. 2B is a schematic diagram of another application scenario of an embodiment of the present invention. As shown in FIG. 2B, the MEC network element is separately connected to the eNB, which means that the MEC network element is attached to the eNB.

It should be noted that this embodiment of the present invention can also be applied to a universal terrestrial radio access network (UTRAN for short), or a Global System for Mobile Communications (GSM for short)/a GSM evolution enhanced data rate (EDGE for short) radio access network (GERAN for short). Different from the LTE network, in the UTRAN or the GERAN, a function of the MME is completed by the SGSN, and a function of the SGW or the PGW is completed by a gateway GPRS support node (GGSN for short).

Figure 3:
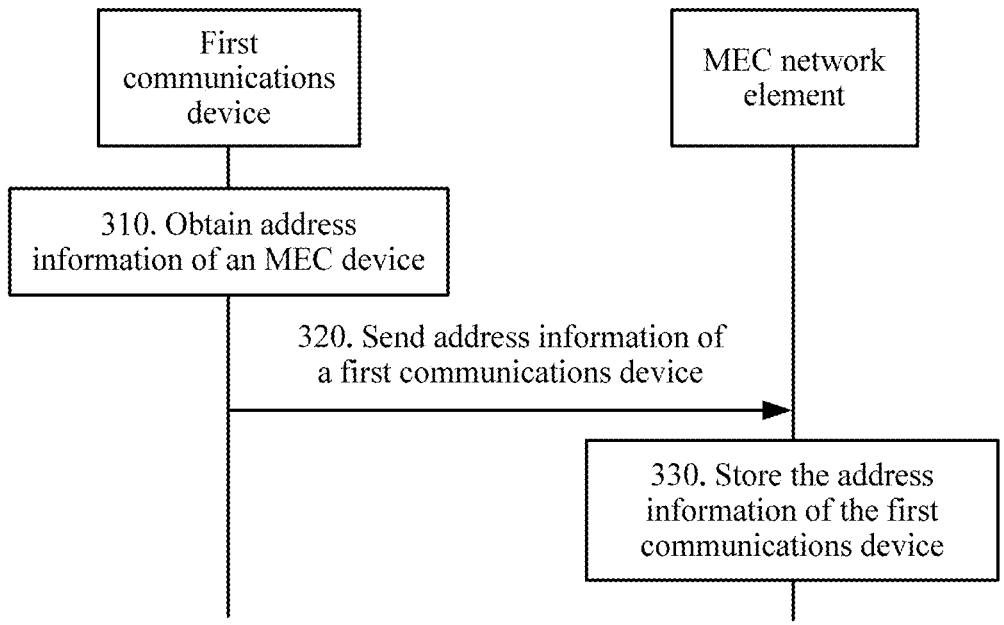
FIG. 3 is a schematic flowchart of a data transmission method according to an embodiment of the present invention.

FIG. 3 is a schematic diagram of communication of a method 300 for data transmission according to an embodiment of the present invention. The method 300 may be performed in a process of accessing a network by a terminal (for example, an attach process or a service request process of a terminal).

As shown in FIG. 3, the method 300 includes the following content.

In operation 310, a first communications device obtains address information of an MEC network element.

The address information of the MEC network element may include either one or both of an IP address of the MEC network element and a TEID of the MEC network element.

In an example, the first communications device may obtain the pre-configured address information of the MEC network element, or the first communications device may obtain the address information of the MEC network element from an MME.

In another example, the first communications device may further obtain the address information of the MEC network element based on a correspondence, and the correspondence is a correspondence between the address information of the MEC network element and either one or both of identification information of the terminal and identification information of the first communications device. For example, an MEC network element query system stores the correspondence, and the MEC network element may obtain the address information of the MEC network element by querying the MEC network element query system based on the identification information of the terminal and/or the identification information of the first communications device.

In operation 320, the first communications device sends the address information of the first communications device to the MEC network element based on the address information of the MEC network element, where the address information of the first communications device is used to determine a destination address of an uplink data packet or a first downlink data packet of the terminal.

Therefore, a data transmission channel may be established between the first communications device and the MEC network element.

The identification information of the terminal is used to identify the terminal. A form of the identification information of the terminal is not limited in this embodiment of the present invention. For example, the identification information of the terminal may be a temporary mobile subscriber identity (TMSI for short), or may be an international mobile subscriber identity (IMSI for short), or may be an eNB UE S1-AP ID or an MME UE S1-AP ID, or the like. The eNB UE S1-AP ID is an identifier allocated by the eNB to the terminal, and the MME UE S1-AP ID is an identifier allocated by the MME to the terminal.

The address information of the first communications device may include either one or both of an IP address of the first communications device and a TEID of the first communications device.

In operation 330, the MEC network element stores the address information of the first communications device.

In this case, the data transmission channel between the MEC network element and the first communications device may be established.

In an example, the first communications device may further instruct the MEC network element to delete the stored address information of the first communications device. For example, when no data is transmitted in the network, and the terminal switches to an idle mode, the first communications device may instruct the MEC network element to delete the stored address information of the first communications device, to save air interface resources. Correspondingly, the MEC network element may delete the stored address information of the first communications device based on the notification of the first communications device.

In the solution of this embodiment of the present invention, the first communications device sends the address information of the first communications device to the MEC network element, so that the MEC network element can determine a destination address of an uplink data packet of the terminal or a first downlink data packet of the terminal based on address information of a communications device. Therefore, a data transmission channel can be established between the MEC network element and the communications device, so that data can be transmitted between the MEC network element and the communications device.

It should be noted that the foregoing first communications device may be an access network device or a gateway device. For example, the first communications device may be the access network device, the method 300 may be applied to an application scenario shown in FIG. 2A and FIG. 2B, so that the data transmission channel is established between the access network device and the MEC network element. When the first communications device is the access network device, the address information of the first communications device is used to determine the destination address of the first downlink data packet of the terminal. For another example, the first communications device may be the gateway device, and the method 300 may be applied to an application scenario shown in FIG. 2A, so that the data transmission channel is established between the MEC network element and the gateway device. When the first communications device is the gateway device, the address information of the first communications device is used to determine the destination address of the uplink data packet of the terminal. Further, the first communications device may receive address information of a second communications device sent by a mobility management network element; and send the address information of the second communications device to the MEC network element, where the address information of the second communications device is used to determine a destination address of a second downlink data packet of the terminal. The second communications device may be an access network device.

It should be noted that the foregoing first downlink data packet of the terminal or the second downlink data packet of the terminal may be a same data packet, or may be different data packets. The foregoing "first" and "second" are intended to indicate different manners of determining a destination address of a downlink data packet of the terminal, instead of constituting another limitation.

In this embodiment of the present invention, the foregoing gateway device may be an SGW, or may be a gateway device that has a function of an SGW and a function of a PGW.

Figure 4:
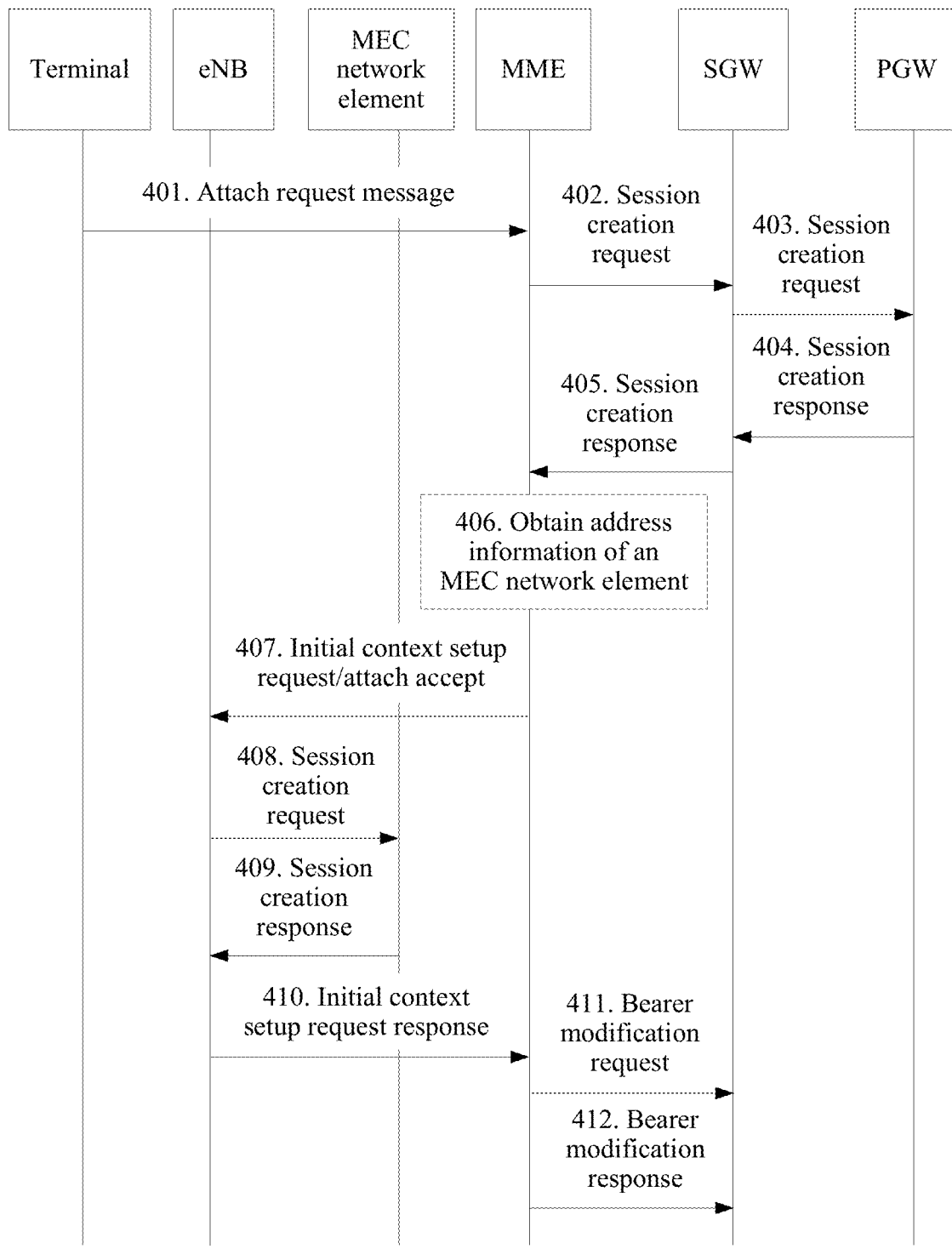
FIG. 4 is a schematic flowchart of another data transmission method according to an embodiment of the present invention.
Figure 5:
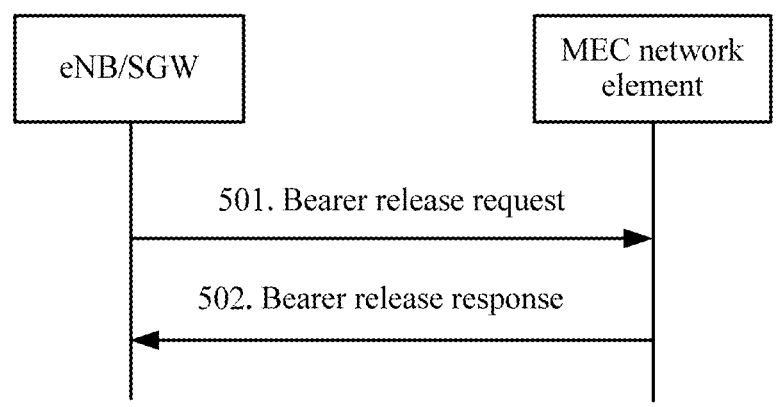
FIG. 5 is a schematic flowchart of still another data transmission method according to an embodiment of the present invention.
Figure 6:
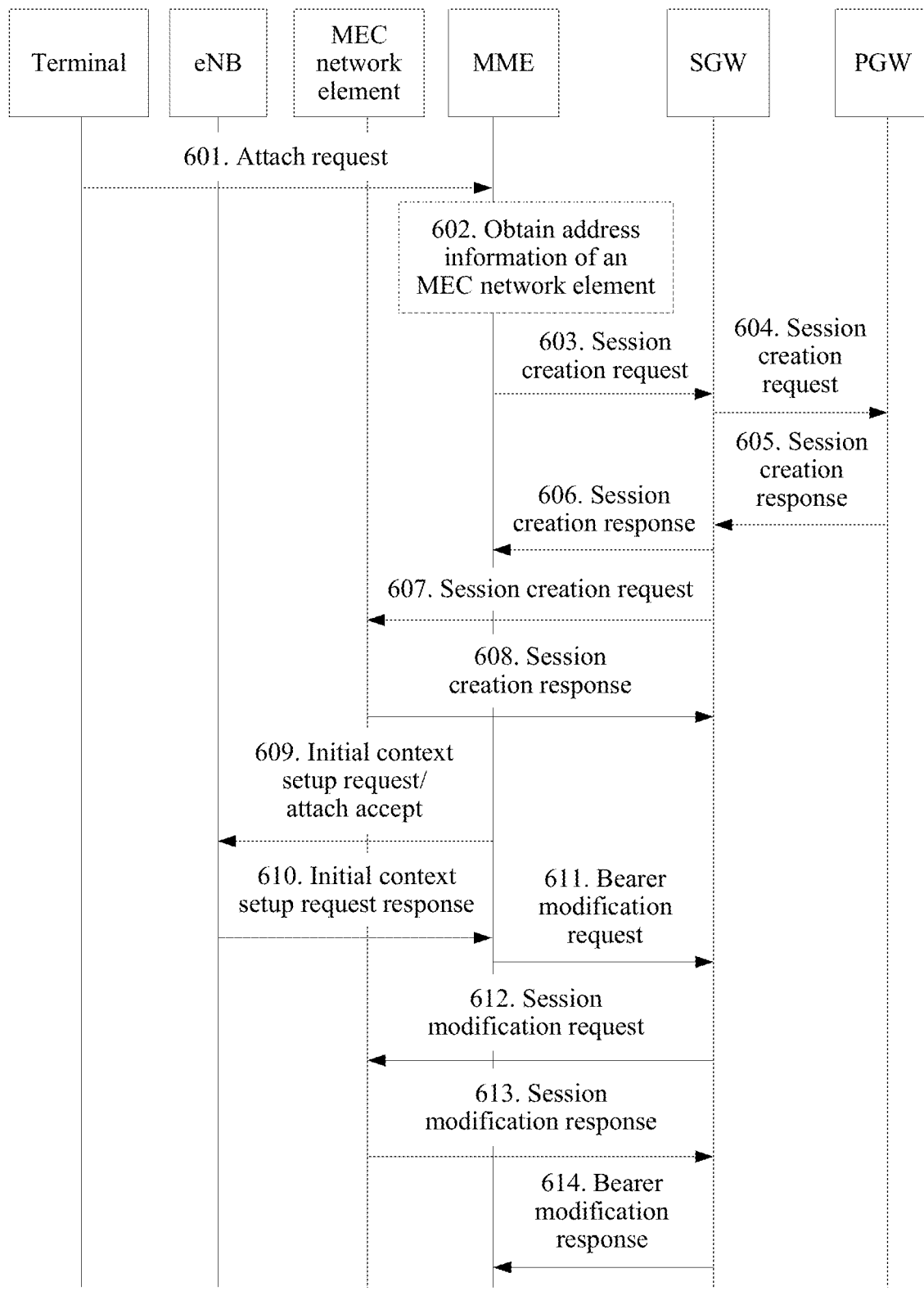
FIG. 6 is a schematic flowchart of still another data transmission method according to an embodiment of the present invention.

The following further describes the solutions of the embodiments of the present invention with reference to FIG. 4 to FIG. 6.

FIG. 4 is a schematic diagram of communication of another method 400 for data transmission according to an embodiment of the present invention. The following uses an example in which the first communications device is an eNB and the second communications device is an SGW to describe the method shown in FIG. 4.

In operation 401, a terminal sends an attach request message to an MME by using the eNB.

In operation 402, the MME sends a session creation request message to the SGW.

In operation 403, the SGW sends the session creation request message to the PGW.

In operation 404, the PGW sends a session creation response message to the SGW.

It should be understood that when the SGW and the PGW are integrated for deployment, operations 403 and 404 do not need to be performed.

In operation 405, the SGW sends the session creation response message to the MME, where the message includes address information of the SGW, for example, an IP address of the SGW, or an IP address and a TEID of the SGW.

In operation 406, the MME obtains address information of an MEC network element.

In an example, the MME may obtain the address information of the MEC network element by querying an MEC network element query system based on at least one of the following information: identification information of a terminal, identification information of the eNB, or address information of the eNB.

In another example, the address information of the MEC network element may alternatively be pre-configured on the MME, and the MME may obtain the pre-configured address information of the MEC network element.

Part 406 is an optional part, and the MME may directly perform part 407 after receiving the session creation response message sent by the SGW (that is, part 405).

In operation 407, the MME sends an initial context setup request message/an attach accept message to the eNB, where the initial context setup request/the attach accept message includes address information of the SGW. The eNB may use an address identified by the address information of the SGW as a destination address of an uplink data packet of the terminal.

In an example, the initial context setup request message/the attach accept message may further include direction indication information of a data flow, for example, uplink.

It should be noted that if the MME performs part 406, correspondingly, the initial context setup request message/the attach accept message may further include the address information of the MEC network element.

In operation 408, the eNB sends a session creation request message to the MEC network element based on the address information of the MEC network element, where the session creation request message includes the address information of the eNB and the address information of the SGW.

A GTP-based tunnel connection may be established between the SGW and the MEC network element, so that the address information of the SGW carried in the session creation request message may include the IP address and the TEID of the SGW.

In an example, the eNB may obtain the address information of the MEC network element in the following manners: For example, the eNB obtains the address information of the MEC network element from the initial context setup request message/the attach accept message sent by the MME; for another example, the eNB may alternatively configure the address information of the MEC network element; and for still another example, the eNB may alternatively obtain the address information of the MEC network element by querying the MEC network element query system based on location information of the terminal and/or location information of the eNB. In the latter two manners, the MME may not perform part 406.

In another example, an IP connection may be established between the eNB and the MEC network element, and the address information of the eNB carried in the session creation request message includes an IP address of the eNB; or a GTP-based tunnel connection may be established between the eNB and the MEC network element, and the address information of the eNB carried in the session creation request message includes the IP address and the TEID of the eNB.

Therefore, the MEC network element may establish context information of the terminal based on the address information of the eNB and the address information of the SGW. For example, the MEC network element may use the address identified by the address information of the eNB as a destination address of a downlink data packet of the terminal, and use the address identified by the address information of the SGW as the destination address of the uplink data packet of the terminal.

In operation 409, the MEC network element receives the session creation request message, and sends a session creation response message to the eNB.

A data transmission channel between the eNB and the MEC network element may be established by performing part 409.

In operation 410, the eNB sends an initial context setup request response message to the MME, where the initial context setup request response message may include the address information of the MEC network element.

In the prior art, the initial context setup request response message includes the address information of the eNB. In this embodiment of the present invention, the initial context setup request response message uses the address information of the MEC network element as the address information of the eNB.

In operation 411, the MME sends a bearer modification request message to the SGW, where the bearer modification request message includes the address information of the MEC network element, to establish a data transmission channel from the SGW to the MEC network element.

The MEC network element is connected to the SGW by using an S1-U interface, that is, a GTP-based tunnel connection is established between the MEC network element and the SGW, and the address information of the MEC network element carried in the bearer modification request message includes the IP address and the TEID of the MEC network element.

In the prior art, the bearer modification request message includes the address information of the eNB. However, in this embodiment of the present invention, the address information of the MEC network element is used as the address information of the eNB. For the SGW, the received address information of the eNB is actually the address information of the MEC network element, and therefore, the SGW can send the downlink data packet to the MEC network element.

In operation 412, the SGW sends a bearer modification response message to the MME. In this case, the data transmission channel from the SGW to the MEC network element can be successfully established.

It should be noted that the messages in the foregoing parts may include the identification information of the terminal, which is used to identify the terminal.

It should be noted that, in FIG. 4, that the SGW and the PGW are separately deployed is only used as an example for description. However, this embodiment of the present invention imposes no limitation thereto, and the SGW may alternatively be integrated with the PGW for deployment.

In the solution of this embodiment of the present invention, a connection is established between the MEC network element and an access network device (for example, an eNB), and the address information of the MEC network element is notified as address information of the access network device to a gateway device (for example, an SGW); that is, the gateway device uses the MEC network element as an access network device.

In other words, a core network device (such as the MME, the SGW, or the PGW) does not need to be modified, the address information of the MEC network element can be transferred to the gateway device by using the access network device (for example, the eNB), and address information of the gateway device is also notified to the MEC network element. In this way, the MEC network element can be connected to the S1-U interface, so that the uplink data packet can arrive at the gateway device through the MEC network element, and the downlink data packet can be transferred by the SGW to an access network by using the MEC network element. Therefore, the data flow can be processed by the MEC network element.

In a specific time period, if no data is transmitted in a network, the terminal switches from a connected mode to an idle mode. When the terminal switches to the idle mode, a bearer between the terminal, the eNB, and the SGW is deleted, to save air interface resources. Correspondingly, the context information of the terminal on the eNB is also deleted. To avoid a waste of storage resources, the MEC network element needs to be instructed in time to delete the context information of the terminal, as shown in FIG. 5.

In operation 501, the eNB sends a bearer release request message to the MEC network element, where the bearer release request message includes information such as an identifier of the terminal.

In operation 502, the MEC network element receives the bearer request message, deletes the stored context information of the terminal based on the bearer release request message, releases a data transmission channel between the MEC network element and the eNB, and sends a bearer release response message to the eNB, where the context information of the terminal includes address information of the eNB.

FIG. 6 is a schematic diagram of communication of another method 600 for data transmission according to an embodiment of the present invention.

In operation 601, a terminal sends an attach request message to an MME by using an access network device eNB.

In operation 602, the MME obtains address information of an MEC network element.

In an example, the MME may obtain the address information of the MEC network element by querying an MEC network element query system based on at least one of the following information: identification information of a terminal, identification information of the eNB, or address information of the eNB. Alternatively, the address information of the MEC network element may be pre-configured on the MME.

It should be noted that part 602 is an optional part.

In operation 603, the MME sends a session creation request message to the SGW.

When the MME performs part 602, the session creation request message may include the address information of the MEC network element.

In operation 604, the SGW sends the session creation request to the PGW.

In operation 605, the PGW sends a session creation response message to the SGW.

It should be understood that when the SGW and the PGW are integrated for deployment, part 604 and part 605 do not need to be performed.

In operation 606, the SGW sends the session creation response message to the MME, where the session creation response message includes the address information of the SGW.

The messages used in part 601 and part 603 to part 606 may include the identification information of the terminal. Details are not described herein again.

It should be noted that a sequence of performing part 606 and part 602 is not limited, and part 602 may alternatively be performed after part 606.

In operation 607, the SGW sends a session creation request message to the MEC network element based on the address information of the MEC network element, where the session creation request message includes the identification information of the terminal and the address information of the SGW, to establish a data transmission channel between the SGW and the MEC network element.

The session creation request message may be used to instruct the MEC network element to establish the context information of the terminal.

In an example, the SGW may obtain the address information of the MEC network element in the following manner: For example, the SGW may obtain the address information of the MEC network element from the MME; for another example, the SGW may alternatively obtain the address information of the MEC network element by querying the MEC network element query system; and for still another example, the address information of the MEC network element may be pre-configured in the SGW. In the latter two manners, the MME may not perform part 602.

In another example, an IP connection may be established between the SGW and the MEC network element, and the address information of the SGW includes an IP address of the SGW; or a GTP-based tunnel connection may be established between the SGW and the MEC network element may be a GTP-based tunnel connection, and the address information of the SGW includes the IP address and the TEID of the SGW.

In operation 608, the MEC network element receives the session creation request message, stores the address information of the SGW, and sends a session creation response to the SGW, where the session creation response message may include the address information of the MEC network element.

After part 608 is performed, data transmission channel is established between the MEC network element and the SGW.

Part 607 and part 608 may be performed after part 606, or may be performed before part 606, or may be performed concurrently with part 606. This is not limited in this embodiment of the present invention.

In operation 609, the MME sends an initial context setup request message/an attach accept message to the eNB, where the initial context setup request message/the attach accept message includes the address information of the MEC network element, to establish a data transmission channel from the eNB to the MEC network element.

It should be noted that the initial context setup request message/the attach accept message in the prior art includes the address information of the SGW. In this embodiment of the present invention, the address information of the MEC network element is sent to the MME as the address information of the SGW.

A GTP-based tunnel connection may be established between the eNB and the MEC network element, and the address information of the MEC network element may include the IP address and the TEID of the MEC network element.

The eNB sends the received uplink data packet to the MEC network element.

In operation 610, the eNB sends an initial context setup request response message to the MME, where the initial context setup request response message includes the address information of the eNB. In this case, the data transmission channel from the eNB to the MEC network element can be established.

The eNB sends the uplink data packet of the terminal to the MEC network element.

In operation 611, the MME sends a bearer modification request message to the SGW, where the bearer modification request message includes the address information of the eNB, to establish a data transmission channel from the SGW to the eNB.

In operation 612, the SGW sends a session modification request message to the MEC network element, where the session modification request message includes the address information of the eNB, to establish a data transmission channel from the MEC network element to the eNB.

In an example, the session modification request message may further include a direction identifier of a downlink data flow. That is, for the downlink data flow, an address of a data packet is the address information of the eNB.

In operation 613, the MEC network element receives the session modification request message, stores the address information of the eNB, and sends a session modification response message to the SGW.

In this case, the data transmission channel from the MEC network element to the eNB can be established. The MEC network element sends a downlink data packet of the terminal to the eNB.

In operation 614, the SGW sends a bearer modification response message to the MME.

The bearer modification response message may be used to notify the MME that the data transmission channel from the MEC network element to the eNB has been established.

In this embodiment of the present invention, the address information of the MEC network element is notified as the address information of the gateway device to the access network device (eNB), that is, the access network device uses the MEC network element as the gateway device.

In this embodiment of the present invention, a connection is established between the gateway device and the MEC network element, and then by using a signaling message between the existing devices, the address information of the MEC network element is notified as the address information of the gateway device to the access network device, and the address information of the access network device is also notified to the MEC network element by using the gateway device. In this way, a connection is established between the access network device and both the MEC network element and the gateway device, and the user plane data transmission channel is successfully established.

It should be noted that, in FIG. 4 and FIG. 6, a terminal attach process is only used as an example for description. However, this embodiment of the present invention imposes no limitation thereto. For example, the solution in this embodiment of the present invention may be further applied to a service request process, and the like.

It should be understood that sequence numbers of the foregoing processes do not mean execution sequences. The execution sequences of the processes should be determined according to functions and internal logic of the processes, and should not constitute any limitation on the implementation processes of the embodiments of the present invention.

The foregoing has described in detail the data transmission method according to the embodiments of the present invention with reference to FIG. 3 and FIG. 6. The following describes in detail an apparatus for data transmission according to an embodiment of the present invention with reference to FIG. 7 to FIG. 12.

The foregoing has mainly described the solutions in the embodiments of the present invention from the perspective of interaction between network elements. It may be understood that, to implement the foregoing functions, the network elements, such as the communications device (for example, the gateway device or the access network device), the MEC network element, and the mobility management network element, include a corresponding hardware structure and/or software module for performing each of the functions. A person skilled in the art should be easily aware that the units and algorithm steps in the examples described with reference to the embodiments disclosed in the present invention may be implemented by hardware or a combination of hardware and computer software. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of the present invention.

In this embodiment of the present invention, function units of the communications device (for example, the gateway device or the access network device), the MEC network element, and the mobility management network element may be divided based on the foregoing method examples. For example, each function unit may be obtained through division for a corresponding function, or two or more functions may be integrated into one processing unit. The integrated unit may be implemented in a form of hardware, or may be implemented in a form of a software function unit. It should be noted that the unit division in the embodiments of the present invention is an example, and is merely logical function division. There may be another division manner during actual implementation.

Figure 7:
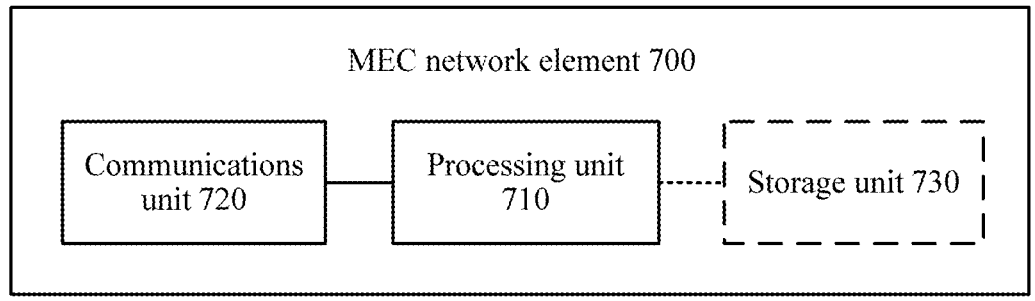
FIG. 7 is a schematic structural diagram of a communications device according to an embodiment of the present invention.

When an integrated unit is used, FIG. 7 is a possible schematic structural diagram of the MEC network element used in the foregoing embodiments. The MEC network element 700 includes a processing unit 710 and a communications unit 720. The processing unit 710 is configured to control and manage an action of the MEC network element. For example, the processing unit 710 is configured to support the MEC network element in performing operation 330 in FIG. 3, operation 409 in FIG. 4, operation 502 in FIG. 5, operation 608 and operation 613 in FIG. 6, and/or another process of the technology described in this specification. The communications unit 720 is configured to support communication between the MEC network element and another network entity, for example, communication between the MEC network element and the eNB, the MME, the SGW, and the like shown in FIG. 2A. The MEC network element may further include a storage unit 730, configured to store program code and data of the MEC network element.

The processing unit 710 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. It may implement or execute various example logical blocks, modules, and circuits that are described with reference to the contents disclosed in the present invention. The processor may also be a combination for implementing a computing function, for example, a combination of one or more microprocessors or a combination of a DSP and a microprocessor. The communications unit 720 may be a communications interface, a transceiver, a transceiver circuit, or the like. The communications interface is a general term, and may include one or more interfaces. The storage unit 730 may be a memory.

Figure 8:
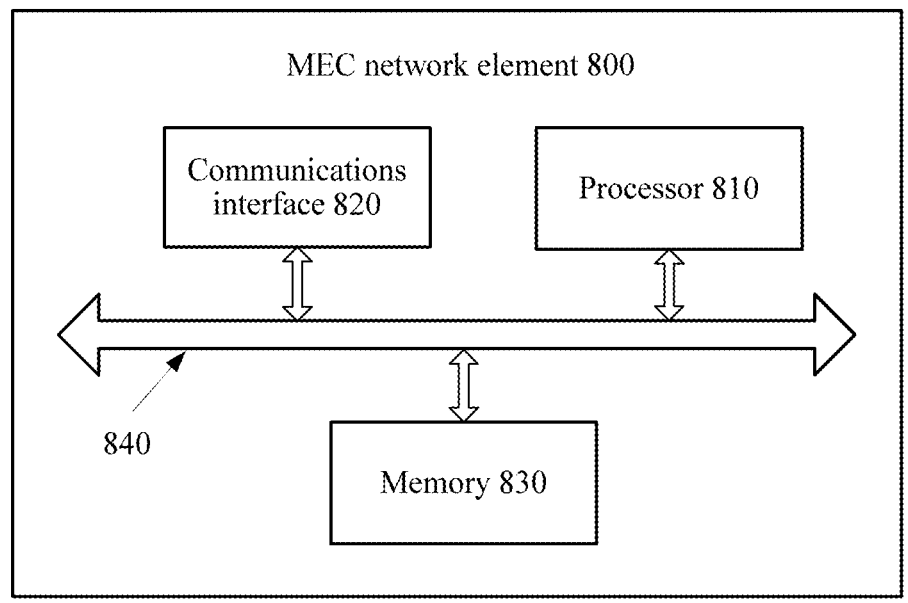
FIG. 8 is a schematic structural diagram of another communications device according to an embodiment of the present invention.

When the processing unit 710 is a processor, the communications unit 720 is a communications interface, and the storage unit 730 is a memory, the MEC network element used in this embodiment of the present invention may be an MEC network element shown in FIG. 8.

As shown in FIG. 8, the MEC network element 800 includes a processor 810, a communications interface 820, and a memory 830. Optionally, the MEC network element 800 may further include a bus 840. The communications interface 820, the processor 810, and the memory 830 may be connected to each other by using the bus 840. The bus 840 may be a peripheral component interconnect (PCI for short) bus, an extended industry standard architecture (EISA for short) bus, or the like. The bus 840 may be classified into an address bus, a data bus, a control bus, or the like. For ease of denotation, the bus is indicated by using only one line in FIG. 8. However, it does not indicate that there is only one bus or only one type of bus.

Figure 9:
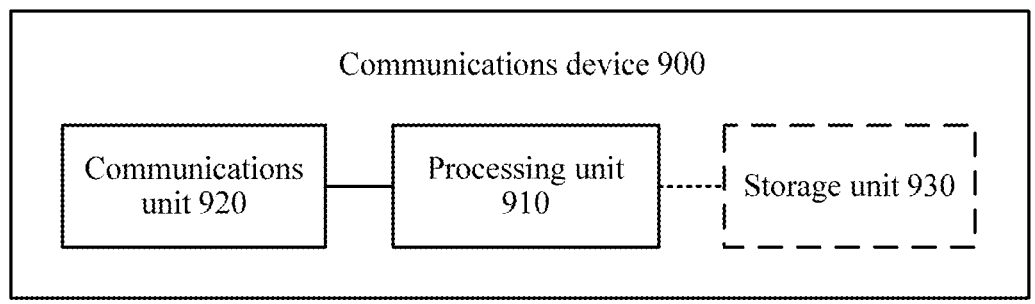
FIG. 9 is a schematic structural diagram of an MEC network element according to an embodiment of the present invention.

FIG. 9 is a possible schematic structural diagram of a communications device used in the foregoing embodiments. The communications device 900 includes a processing unit 910 and a communications unit 920. It should be understood that the communications device 900 may be an access network device or a gateway device. The processing unit 910 is configured to control and manage an action of the communications device. For example, the processing unit 910 is configured to support the communications device in performing the process 310 and the process 320 in FIG. 3, and/or is configured to perform another process of the technology described in this specification. It should be understood that when the communications device 900 is an access network device, the processing unit 910 is configured to support the communications device in performing the process 408 in FIG. 4, and the process 501 in FIG. 5. When the communications device 900 is a gateway device, the processing unit 910 is configured to support the communications device in performing the process 501 in FIG. 5, and the process 607 and the process 612 in FIG. 6. The communications unit 920 is configured to support communication between the communications device and another network entity, for example, communication between the communications device and the MME shown in FIG. 2A. The communications device may further include a storage unit 930, configured to store program code and data of the communications device.

The processing unit 910 may be a processor or a controller, for example, may be a CPU, a general purpose processor, a DSP, an ASIC, an FPGA or another programmable logic device, a transistor logic device, a hardware component, or any combination thereof. It may implement or execute various example logical blocks, modules, and circuits that are described with reference to the contents disclosed in the present invention. The processor may also be a combination for implementing a computing function, for example, a combination of one or more microprocessors or a combination of a DSP and a microprocessor. The communications unit 920 may be a communications interface, a transceiver, a transceiver circuit, or the like. The communications interface is a general term, and may include one or more interfaces. The storage unit 930 may be a memory.

Figure 10:
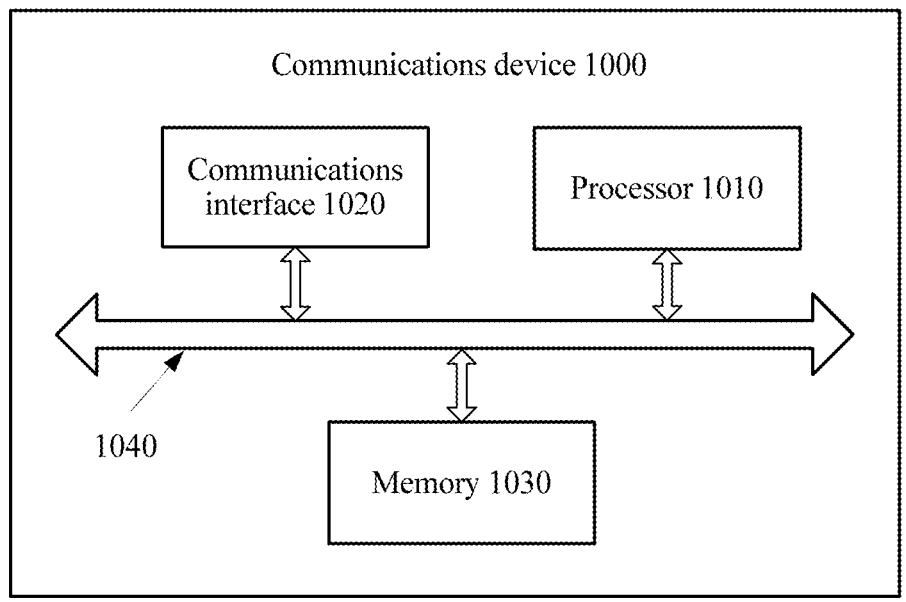
FIG. 10 is a schematic structural diagram of another MEC network element according to an embodiment of the present invention.

When the processing unit 910 is a processor, the communications unit 920 is a communications interface, and the storage unit 930 is a memory, the communications device used in this embodiment of the present invention may be a communications device shown in FIG. 10.

As shown in FIG. 10, the communications device 1000 includes a processor 1010, a communications interface 1020, and a memory 1030. Optionally, the communications device 1000 may further include a bus 1040. The communications interface 1020, the processor 1010, and the memory 1030 may be connected to each other by using the bus 1040. The bus 1040 may be a PCI bus, an EISA bus, or the like. The bus 1040 may be classified into an address bus, a data bus, a control bus, or the like. For ease of denotation, the bus is indicated by using only one line in FIG. 10. However, it does not indicate that there is only one bus or only one type of bus.

Figure 11:
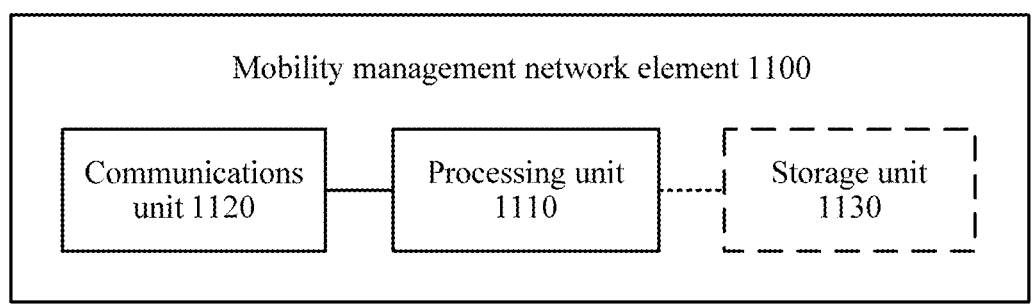
FIG. 11 is a schematic structural diagram of a mobility management network element according to an embodiment of the present invention.

FIG. 11 is a possible schematic structural diagram of a mobility management network element used in the foregoing embodiments. The mobility management network element 1100 includes a processing unit 1110 and a communications unit 1120. It should be understood that the mobility management network element 1100 may be an access network device or a gateway device. The processing unit 1110 is configured to control and manage an action of the mobility management network element. For example, the processing unit 1110 is configured to support the mobility management network element in performing the process 406 and the process 407 in FIG. 4, the process 602 and the process 603 in FIG. 6, and/or another process of the technology described in this specification. The communications unit 1120 is configured to support communication between the mobility management network element and another network entity, for example, communication between the mobility management network element and the eNB and the SGW shown in FIG. 2A. The mobility management network element may further include a storage unit 1130, configured to store program code and data of the mobility management network element.

The processing unit 1110 may be a processor or a controller, for example, may be a CPU, a general purpose processor, a DSP, an ASIC, an FPGA or another programmable logic device, a transistor logic device, a hardware component, or any combination thereof. It may implement or execute various example logical blocks, modules, and circuits that are described with reference to the contents disclosed in the present invention. The processor may also be a combination for implementing a computing function, for example, a combination of one or more microprocessors or a combination of a DSP and a microprocessor. The communications unit 1120 may be a communications interface, a transceiver, a transceiver circuit, or the like. The communications interface is a general term, and may include one or more interfaces. The storage unit 1130 may be a memory.

Figure 12:
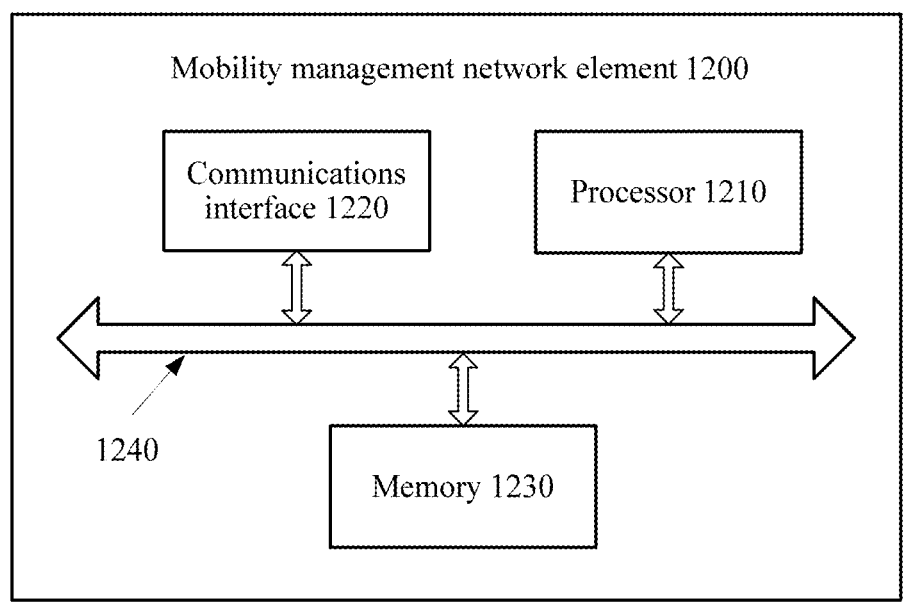
FIG. 12 is a schematic structural diagram of another mobility management network element according to an embodiment of the present invention.

When the processing unit 1110 is a processor, the communications unit 1120 is a communications interface, and the storage unit 1130 is a memory, the mobility management network element used in this embodiment of the present invention may be a mobility management network element shown in FIG. 12.

As shown in FIG. 12, the mobility management network element 1200 includes a processor 1210, a communications interface 1220, and a memory 1230. Optionally, the mobility management network element 1200 may further include a bus 1240. The communications interface 1220, the processor 1210, and the memory 1230 may be connected to each other by using the bus 1240. The bus 1240 may be a PCI bus, an EISA bus, or the like. The bus 1240 may be classified into an address bus, a data bus, a control bus, or the like. For ease of denotation, the bus is indicated by using only one line in FIG. 12. However, it does not indicate that there is only one bus or only one type of bus.

The methods or algorithm operations described with reference to the content disclosed in the embodiments of the present invention may be implemented in a hardware manner, or may be implemented in a manner of executing a software instruction by a processor. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other form well-known in the art. A storage medium used as an example is coupled to the processor, so that the processor can read information from the storage medium, and can write information into the storage medium. Certainly, the storage medium may be a part of the processor. The processor and the storage medium may be located in an ASIC. In addition, the ASIC may be located in a gateway device or a mobility management network element. Certainly, the processor and the storage medium may exist in the gateway device or the mobility management network element as discrete components.

A person skilled in the art should be aware that in one or more of the foregoing examples, the functions described in the embodiments of the present invention may be implemented by hardware, software, firmware, or any combination thereof. When this application is implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general or dedicated computer.

The objectives, technical solutions, and beneficial effects of the embodiments of the present invention are further described in detail in the foregoing specific embodiments. It should be understood that the foregoing descriptions are only specific implementations of the embodiments of the present invention, but are not intended to limit the protection scope of the embodiments of the present invention. Any modification, equivalent replacement, or improvement made based on the technical solutions in the embodiments of the present invention shall fall within the protection scope of the embodiments of the present invention.

What is claimed is:

1. A data transmission method, comprising:
   receiving, by a mobile edge computing (MEC) network element, address information of a first communications device from the first communications device; and
   storing, by the MEC network element, the address information of the first communications device, wherein the address information of the first communications device is used to determine a destination address of an uplink data packet or a first downlink data packet of a terminal,
   when the address information of the first communications device is used to determine the destination address of the uplink data packet of the terminal,
      receiving by the MEC network element, address information of a second communications device from the first communications device; and
      storing, by the MEC network element, the address information of the second communications device, wherein the address information of the second communications device is used to determine a destination address of a second downlink data packet of the terminal.

2. The method according to claim 1, further comprising:
   deleting, by the MEC network element, the stored address information of the first communications device.

3. A mobile edge computing (MEC) network element, comprising:
   a processor; and
   a communications interface, wherein the processor is configured to
      receive, using the communications interface, address information of a first communications device from the first communications device, and
      store the address information of the first communications device, wherein the address information of the first communications device is used to determine a destination address of an uplink data packet or a first downlink data packet of a terminal,
   wherein when the address information of the first communications device is used to determine the destination address of the uplink data packet of the terminal, the processor is further configured to
      receiving, using the communication interface, address information of a second communications device from the first communications device; and
      storing the address information of the second communications device, wherein the address information of the second communications device is used to determine a destination address of a second downlink data packet of the terminal.

4. The MEC network element according to claim 3, wherein the processor is further configured to delete the stored address information of the first communications device.

5. A communications device, comprising:
   a processor; and
   a communications interface, wherein the processor is configured to
      obtain address information of a mobile edge computing MEC network element, and
      send, based on the address information of the MEC network element and using the communications interface, address information of the communications device to the MEC network element, wherein the address information of the communications device is used to determine a destination address of an uplink data packet or a first downlink data packet of a terminal, receive, by using the communications interface, the address information of the MEC network element from a mobility management network element, or obtain the address information of the MEC network element based on a correspondence, wherein the correspondence is a correspondence between the address information of the MEC network element and either one or both of identification information of the terminal and identification information of a first communications device.

6. A communications device, comprising:
a processor; and
a communications interface, wherein the processor is configured to obtain address information of a mobile edge computing MEC network element, and send, based on the address information of the MEC network element and using the communications interface, address information of the communications device to the MEC network element, wherein the address information of the communications device is used to determine a destination address of an uplink data packet or a first downlink data packet of a terminal, wherein the communications device is a first communications device, and address information of the first communications device is used to determine the destination address of the uplink data packet of the terminal, wherein the processor is further configured to receive, using the communications interface, address information of a second communications device from a mobility management network element, and send, using the communications interface, the address information of the second communications device to the MEC network element, wherein the address information of the second communications device is used to determine a destination address of a second downlink data packet of the terminal.

7. The communications device according to claim 5, wherein the processor is further configured to instruct, using the communications interface, the MEC network element to delete stored address information of the communications device.

* * * * *